R. MOODY.

Hold Back.

No. 83,400.

Patented Oct. 27, 1868.

Witnesses:
Henry C. Houston
John E. Coffin.

Inventor:
Rufus Moody
Wm H Clifford

RUFUS MOODY, OF MONMOUTH, MAINE.

Letters Patent No. 83,400, dated October 27, 1868.

IMPROVEMENT IN HOLDBACK.

The Schedule referred to in these Letters Patent and making part of the same.

*To all whom it may concern:*

Be it known that I, RUFUS MOODY, of Monmouth, in the county of Kennebec, and State of Maine, have invented a new and useful Improved Holdback; and I hereby declare the following to be a full, clear, and exact description thereof, which will enable others to make and use my invention, reference being had to the accompanying drawings, forming part of this specification, in which—

Figure 1:
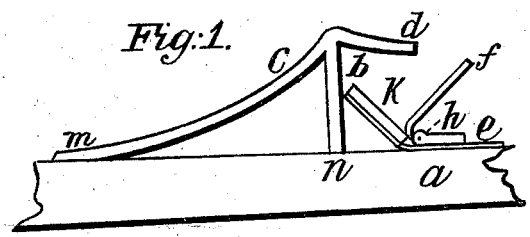

Figure 1 shows a side view of my invention when in operation.

Figure 2:
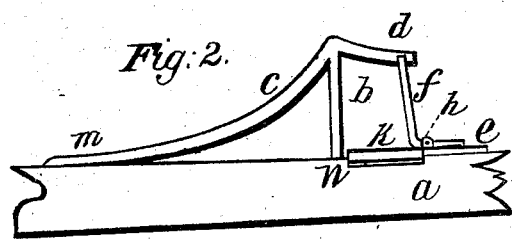

Figure 2, the same, when at rest.

I am aware of the existence of patents for holdbacks which free the breeching-strap automatically, if the animal is so released from the harness as to draw forward on the same. I do not claim broadly a self-releasing breeching-strap holder. I claim the method and device herein shown, which I will proceed to describe, as follows:

$a$ shows a portion of a carriage-shaft; $b$, an upright attachment thereto, against which the breeching-strap bears or presses when the animal is holding back, as when descending a hill.

This upright, $b$, is held and strengthened by the brace $c$, which part is extended in a horizontal direction, (see $d$,) so as to form a loop to hold the breeching-strap.

$e$ shows a piece of metal, secured by screws, or otherwise, to the shaft.

$f$ shows another piece of metal, to close the open end of the loop. This piece or plate $f$ is hinged to $e$ at $h$.

Rigidly connected with $f$ is a plate, of metal, $k$. This is concave on its under side, so as to conform to the convexity of the shaft.

$c$ is attached to the shaft at $m$; $b$, at $n$.

When the breeching-strap is simply drawn back against the upright, $b$, $f$ remains as seen in fig. 2, the loop is closed, and the strap resting edgewise between $k$ and $d$, keeps the plate $k$ pressed down on the shaft, and prevents the loop from opening by the inclination of $f$, as seen is fig. 1; that is, the loop is fastened by the breeching-strap.

Should the animal be partially detached from the vehicle by the tugs being unfastened when he starts forward, the breeching-strap, being drawn by him, will push forward $f$, as seen in fig. 1, raise $k$, and thus the strap slip out of the open loop, and the horse be free from the carriage.

$k$ thus helps to lock or keep closed the loop, and also to throw out the strap when it is raised, as in fig. 1.

$f$ may have a slot in its upper edge, so as to lap over $d$.

The holdback is applicable either to the top or bottom side of a shaft.

The patents of Leslie and Thurston, September 1, 1863, and R. W. Carrier, December 20, 1859, are both different from mine in the particular of employing springs to keep the mouth of the loop on the shaft closed. Mine does not employ any spring, but keeps the end of the loop closed by means of the breeching resting edgewise in the loop, and keeping $k$ pressed down on to the shaft $a$. It is thus less liable to break, having no spring.

I disclaim the arrangement of an open holdback-loop, pivoted lever, stop-bar, a heel or extension, and a flat spring, as in the patent of Carrier, above named.

I also disclaim a breeching-hook with a spring-lever, turning on a pivot, and placed in the open end of the loop.

Also I disclaim a spring-lever with rectangular arms, reaching up to the bow of the breeching-hook, as in the patent of Leslie and Thurston, before named. My invention is both held closed and opened by the breeching-strap, and has no spring.

What I claim as my invention, and desire to secure by Letters Patent, is—

The loop $b\ c\ d$, in conjunction with the plate $e$, piece $f$, plate $k$, and hinge $h$, to be operated by the breeching-strap of the harness, as herein described, when attached to a carriage-shaft, as and for the purposes set forth.

RUFUS MOODY.

Witnesses:
CYRUS L. OWEN,
WM. B. SNELL.